(12) United States Patent
Anderson et al.

(10) Patent No.: US 11,651,309 B2
(45) Date of Patent: May 16, 2023

(54) SYSTEM WITH CAPACITY AND RESOURCE ALLOCATION DISPLAY TO FACILITATE UPDATE OF ELECTRONIC RECORD INFORMATION

(71) Applicant: Hartford Fire Insurance Company, Hartford, CT (US)

(72) Inventors: Matthew W. Anderson, Portland, CT (US); Steven J. Barrett, Hebron, CT (US); Alan S. Mickey, Vernon, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 442 days.

(21) Appl. No.: 16/541,574

(22) Filed: Aug. 15, 2019

(65) Prior Publication Data
US 2021/0049530 A1 Feb. 18, 2021

(51) Int. Cl.
*G06Q 10/0631* (2023.01)
(52) U.S. Cl.
CPC ........... *G06Q 10/06312* (2013.01); *G06Q 10/063116* (2013.01)
(58) Field of Classification Search
None
See application file for complete search history.

(56) References Cited

U.S. PATENT DOCUMENTS

| | | | |
|---|---|---|---|
| 7,478,051 B2 * | 1/2009 | Nourbakhsh | G06Q 10/06 705/7.37 |
| 9,426,291 B1 * | 8/2016 | Ouimette | H04M 3/523 |
| 11,126,941 B1 * | 9/2021 | Schlintl | G06Q 10/103 |
| 11,416,958 B1 * | 8/2022 | Reichert | G06Q 10/1091 |

(Continued)

FOREIGN PATENT DOCUMENTS

| | | | |
|---|---|---|---|
| CN | 104537518 A | * | 4/2015 |
| CN | 107665383 A | * | 2/2018 |

OTHER PUBLICATIONS

V. K. Rai and P. Chandak, "Shift planning and scheduling for IT service operations management," 2015 Annual IEEE Systems Conference (SysCon) Proceedings, 2015, pp. 645-652, doi: 10.1109/SYSCON.2015.7116824 (Year: 2015).*

(Continued)

*Primary Examiner* — Shelby A Turner
(74) *Attorney, Agent, or Firm* — Buckley, Maschoff & Talwalkar LLC

(57) ABSTRACT

A planned resource allocation data store may contain electronic records representing a plurality of planned resource allocations for an enterprise. An actual resource allocation data store may contain electronic records representing a plurality of actual resource allocations. A back-end application computer server may receive, from a remote user device associated with a first user identifier, data about planned and actual resource allocations and update the data stores. The computer server may also receive an indication of a period of time to be analyzed and access information in the planned and actual resource allocation data stores associated with the first user identifier and the period of time. A total planned occupancy value and a total actual occupancy value may then be calculated and displayed via an interactive user interface based on the accessed information.

15 Claims, 21 Drawing Sheets

(56) References Cited

U.S. PATENT DOCUMENTS

| | | | |
|---|---|---|---|
| 2004/0098291 | A1 | 5/2004 | Newburn |
| 2008/0195452 | A1* | 8/2008 | Ponce de Leon .. G06Q 10/0635 705/7.12 |
| 2011/0054968 | A1 | 3/2011 | Galaviz |
| 2014/0052489 | A1* | 2/2014 | Prieto .................... G06Q 10/06 705/7.23 |
| 2014/0249877 | A1 | 9/2014 | Hull et al. |
| 2015/0206082 | A1 | 7/2015 | Sarvepalle et al. |
| 2016/0019491 | A1* | 1/2016 | Arlia .............. G06Q 10/063118 705/7.14 |
| 2016/0124775 | A1* | 5/2016 | Ashtiani ................ G06F 9/5022 718/104 |
| 2016/0196524 | A1* | 7/2016 | Ito ................... G06Q 10/063112 705/7.14 |
| 2016/0307134 | A1* | 10/2016 | Cantor ................ G06Q 10/0633 |
| 2017/0068933 | A1* | 3/2017 | Norton ............. G06Q 10/06398 |
| 2017/0339068 | A1* | 11/2017 | Harned ................. H04L 41/147 |
| 2018/0052814 | A1 | 2/2018 | Mundiwala et al. |
| 2018/0365608 | A1 | 12/2018 | Powell |

OTHER PUBLICATIONS

T. Mladenova, "A project managment system for time planning and resources allocation," 2019 42nd International Convention on Information and Communication Technology, Electronics and Microelectronics (MIPRO), 2019, pp. 1299-1303, doi: 10.23919/MIPRO.2019.8756834. (Year: 2019).*

Siddiqa, Aisha, et al. "A survey of big data management: Taxonomy and state-of-the-art." Journal of Network and Computer Applications 71 (2016): 151-166. (Year: 2016).*

* cited by examiner

Capacity and Resource Allocation Tool:
Add Work

- Date Added: 7/20/2022 — 510
- Target Start Date:
- Target End Date:
- Revised End Date:
- Actual Completion:
- Sub Work Type:
- Employee:
- Help Desk Ticket:
- Description: Enter Text — 520
- Comments: Enter Text — 522
- Edit Comments: ☑

- Flag: Green
- Status: — 530

- Category/Bucket: — 540
- Planned Hours: 0
- Actual Hours: 0 — 550
- Original Planned Hours States — 560
- Alaska
- Alabama
- Arkansas
- Arizona

590

Attach File — 575
Delete: ☐
Submit — 570
Cancel — 580

CAPACITY AND RESOURCE ALLOCATION

ELECTRONIC RECORD ACCESS AND UPDATE TOOL

CAPACITY AND RESOURCE ALLOCATION

ELECTRONIC RECORD ACCESS AND UPDATE TOOL

Capacity and Resource Allocation Tool:
Add Work

| | | |
|---|---|---|
| Date Added: | 7/20/2022 ▽ | |
| Target Start Date: | 7/20/2022 ▽ | |
| Target End Date: | 7/20/2022 ▽ | |
| Revised End Date: | 7/20/2022 ▽ | |
| Actual Completion: | ▽ | |
| Sub Work Type: | ▽ | |
| Analyst: | Ms. Jones ▽ | |
| Help Desk Ticket: | | |

Flag: Green ▽
Status: In Progress ▽

Category/Bucket: — 640
Planned Hours:
Actual Hours:
Original Planned Hours

Dropdown (690):
- Development | Recruit
- Development | Coaching
- Development | Misc.
- Out of Office | PTO
- Out of Office | Holiday
- Education | HR
- Education | Professional
- Education | IT Security States: California ▽

Description: This project is to help develop documentation. — 620

Comments: Edited 7/10/2022 11:16:23 AM (Ms. Jones) — 622

Edit Comments: ☑

Delete: ☐
Submit — 670
Cancel

Search for Work

Select filters below and click search. Leaving a filter blank will include everything from that category.

Work Type: Admin/Misc., Documentation, Human Resources, Other
- Select All
- Clear All — 910

Flag: Green, Yellow, Red
- Select All
- Clear All — 930

Date Added:
Target Date:
Completion Date:
- Clear Dates — 950

Employee: Ms. North, Mr. Jones, Ms. Blue, Mr. West
- Select All
- Clear All — 920

Status: Backlog, Cancelled, Complete, In Progress
- Select All
- Clear All — 940

- Search — 960
- Cancel — 990

Include Deleted: ☐

900

CAPACITY AND RESOURCE ALLOCATION
ELECTRONIC RECORD ACCESS AND UPDATE TOOL

Time Entry

Date Range
7/1/2023  7/23/2023
↓  ↑
Change Week

| Category | Bucket | Sun | Mon | Tue | Wed | Thu | Fri | Sat |
|---|---|---|---|---|---|---|---|---|
| Development | Training | 0 | 1 | 0 | 1 | 1 | 0 | 0 |
| Development | Team Meeting | 0 | 0 | 8 | 1 | 0 | 0 | 0 |
| Portfolio | Sales | 0 | 7 | 0 | 5 | 0 | 0 | 0 |
| Portfolio | Outreach | 0 | 0 | 0 | 0 | 7 | 7 | 0 |

TOTAL WEEKLY HOURS

Sunday 0
Monday 8
Tuesday 8
Wednesday 7
Thursday 8
Friday 7
Saturday 0
Total 38

Save and Close   Save

PLANNED v. ACTUAL TIME

Mr. John Benjamin

| | | Planned | Actual |
|---|---|---|---|
| Development | Coaching | 1 | 0 |
| Development | Meetings | 3 | 1 |
| | Development Total: | 4 | 1 |
| Out of Office | Holiday | 8 | 8 |
| Out of Office | Paid Time Off | 8 | 16 |
| | Out of Office Total: | 16 | 24 |
| Portfolio | Home | 3 | 1.5 |
| Portfolio | Other | 4.5 | 2 |
| | Portfolio Total: | 7.5 | 3.5 |
| Run Business | Demand Management Strategy | 4 | 1 |
| Run Business | Meetings | 24.5 | 10.75 |
| | Run Business Total: | 28.5 | 11.75 |

| | Total Demand | Total Capacity | Total Occupancy |
|---|---|---|---|
| Planned: | 40 | 24 | 167% |
| Actual: | 16.25 | 16 | 102% |

Date Range: 7/1/2023 — 7/23/2023
Change Week

| ID | | | | |
|---|---|---|---|---|
| 423 | Status Meeting | Mr. North | 7/14/2023 | Team status huddle... | 2.0 |
| 452 | HR | | | | |

FIG. 14

Capacity and Resource Allocation Tool Dashboard

Please Make Selections Below

Employee:
- Ms. North
- Mr. Jones
- Ms. Blue
- Mr. West

Select All  Clear All

Department: — 1610
- Pricing
- Analytics
- Quality
- Recovery

*Drill Up*

Team: — 1620
- Form Creation (Ms. West)
- Incident Management (Mr. Brown)
- Product Quality (Ms. Smith)
- Recovery Team (Mr. Jones)

*Drill Up*

Start Date: 7/7/2023
End Date: 7/23/2023

← → Change Week

- Low-Level Categories/Buckets
  - High-Level Categories/Buckets

- Include Run Business Category
  - Include Portfolio Category
  - Include Development Category
  - Include All Categories (Update)  (PDF Export)

FIG. 16

| EMPLOYEE ID 2002 | EMPLOYEE NAME 2004 | CATEGORY/BUCKET (DATE) 2006 | PLANNED HOURS WORKED 2008 | ... | ACTUAL HOURS WORKED 2010 |
|---|---|---|---|---|---|
| E_10001 | MS. WEST | PTO (12/25/2023) | 8.0 | | 8.0 |
| E_10001 | MS. WEST | S/W UPDATE (1/26/2023) | 6.0 | | 7.5 |
| E_10001 | MS. WEST | MEETINGS (1/26/2023) | 1.5 | | 2.0 |
| E_10002 | MR. BENJAMIN | PTO (12/25/2023) | 8.0 | | 8.0 |

SYSTEM WITH CAPACITY AND RESOURCE ALLOCATION DISPLAY TO FACILITATE UPDATE OF ELECTRONIC RECORD INFORMATION

BACKGROUND

Electronic records, such as files and database entries, may be stored and utilized by an enterprise. For example, a company such as an insurance enterprise might access and update electronic records associated with potential and actual resource allocations (e.g., hours worked on various projects). In some cases, the planned allocation of resources will differ from the amount of resources that were actually required to perform a task. As a result, the allocation of resources might not be optimized, some resources might be underutilized while others are over-committed, etc. Accurately recording planned time and actual time spent on work items may help an employee and/or an enterprise better plan workloads, improve understanding of how projects should be prioritized, and allow for new initiatives to accomplish an organization's goals. Correctly tracking and analyzing resources allocations, however, can be a time-consuming and error-prone task for employees, managers, etc. (especially when there are a substantial number of employees, many different types of tasks to be tracked, etc.). This information might typically be compiled and stored using a spreadsheet application (e.g., such as the EXCEL® spreadsheet application available from Microsoft®). Manually updating and analyzing appropriate electronic records in this way, however, can be a difficult process. It would therefore be desirable to provide systems and methods to access and update electronic records representing resource allocations for an enterprise in a way that provides faster, more accurate results.

SUMMARY OF THE INVENTION

According to some embodiments, systems, methods, apparatus, computer program code and means are provided to access and update electronic records representing resource allocations for an enterprise in a way that provides faster, more accurate results and that allow for flexibility and effectiveness when analyzing those results. In some embodiments, a planned resource allocation data store may contain electronic records representing a plurality of planned resource allocations for an enterprise. An actual resource allocation data store may contain electronic records representing a plurality of actual resource allocations. A back-end application computer server may receive, from a remote user device associated with a first user identifier, data about planned and actual resource allocations and update the data stores. The computer server may also receive an indication of a period of time to be analyzed and access information in the planned and actual resource allocation data stores associated with the first user identifier and the period of time. A total planned occupancy value and a total actual occupancy value may then be calculated and displayed via an interactive user interface based on the accessed information.

Some embodiments comprise: means for receiving, at a back-end application computer server from a remote user device associated with a first user identifier, data about a planned resource allocation to be performed in the future; means for updating a planned resource allocation data store based on the received data about the planned resource allocation associated with the first user identifier, wherein the planned resource allocation data store contains electronic records that represent a plurality of planned resource allocations for the enterprise and, for each planned resource allocation, an electronic record identifier and a set of planned resource allocation attribute values including a resource allocation category and a user identifier; means for receiving, at the back-end application computer server from the remote user device associated with the first user identifier, data about an actual resource allocation that has been performed in the past; means for updating an actual resource allocation data store based on the received data about the actual resource allocation associated with the first user identifier; means for receiving an indication of a period of time to be analyzed; means for accessing information in the planned and actual resource allocation data stores associated with the first user identifier and the period of time; means for calculating a total planned occupancy value and a total actual occupancy value based on the accessed information; and means for arranging to display the total planned and actual occupancy values via an interactive user interface display.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to access and update electronic records representing resource allocations for an enterprise in a way that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is an example of an add work display in accordance with some embodiments.

FIG. 6 is an example of a category/bucket display according to some embodiments.

FIG. 9 is an example of a work search display in accordance with some embodiments.

FIG. 10 is an example of an employee selection display according to some embodiments.

FIG. 12 is an example of an actual time entry display according to some embodiments.

FIG. 13 is an example of a planned v. actual time employee selection display in accordance with some embodiments.

FIG. 14 is an example of a planned v. actual time display according to some embodiments.

FIGS. 15 and 16 are examples of dashboard selection displays in accordance with some embodiments.

FIG. 20 is a portion of a tabular planned resource allocation database according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic record attribute access, update, and/or analysis by providing benefits in data accuracy, data availability, and data integrity—and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention planned and actual resource allocation information may be entered, accessed, updated (e.g., with tags or other annotations), and analyzed via a back-end application server to accurately improve the exchange of information, thus improving the overall efficiency of the system associated with message storage requirements and/or bandwidth considerations (e.g., by reducing the number of messages that need to be transmitted via a network). Moreover, embodiments associated with accessing and updating accurate, pertinent information might further improve employee planning and performance, project execution, allocations of resources, electronic record processing decisions (e.g., to automatically generate an alert signal or message when planned and actual values diverge more than a threshold amount), etc.

Figure 1:
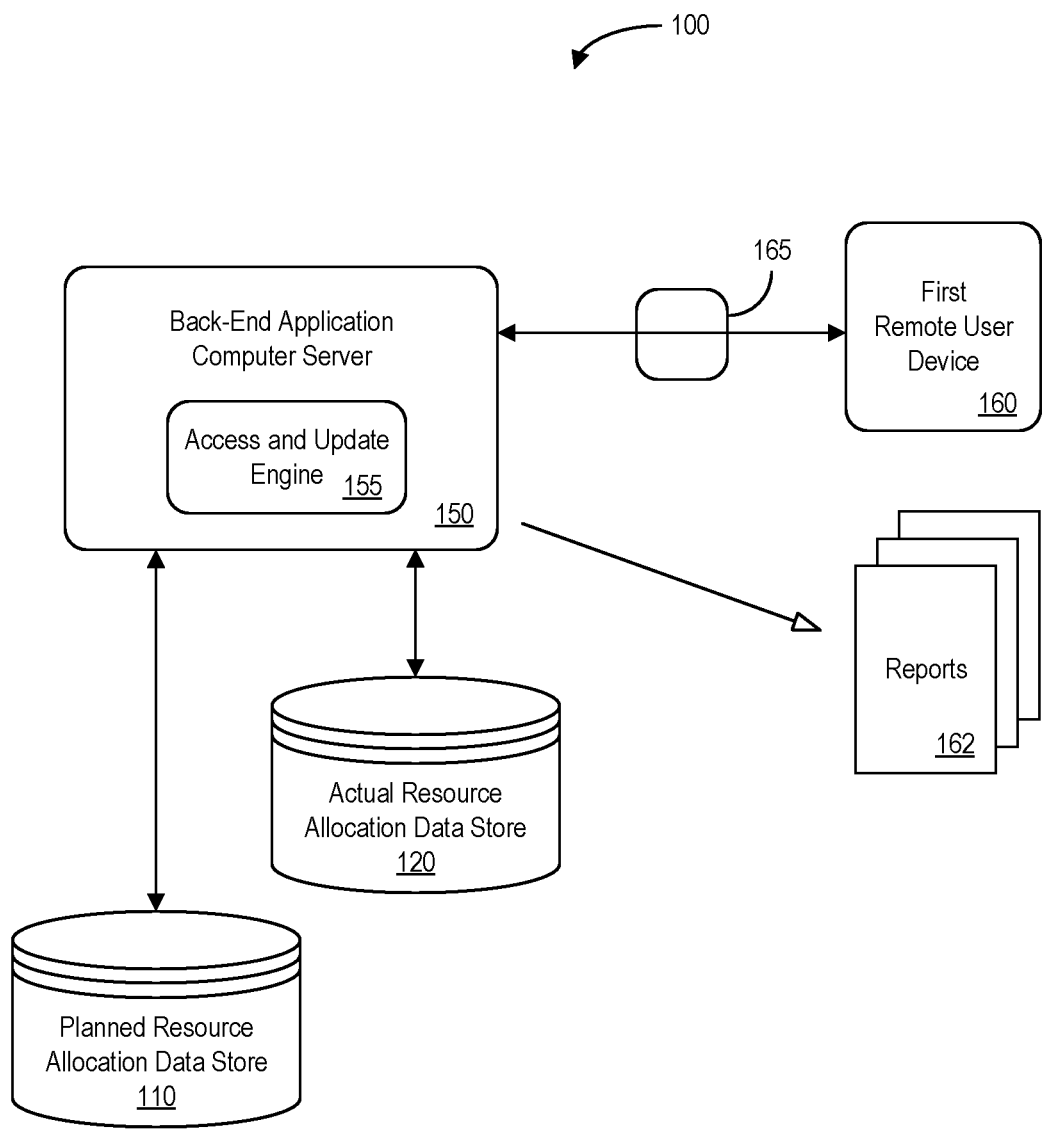
FIG. 1 is a high-level block diagram of a system in accordance with some embodiments.

FIG. 1 is a high-level block diagram of a system 100 according to some embodiments of the present invention. In particular, the system 100 includes a back-end application computer 150 server that may be used to enter and/or access information in a planned resource allocation data store 110 (e.g., storing a set of electronic records representing planned hours to be worked on a task with each record including, for example, one or more task identifiers, attribute variables, resource values, etc.). The back-end application computer server 150 may also store and/or or retrieve information via other data stores or sources, such as an actual resource allocation data store 120, in connection with an access and update engine 155 to view, analyze, and/or update the electronic records. The back-end application computer server 150 may also exchange information with a first remote user device 160 and other remote user devices (e.g., via a firewall 165). According to some embodiments, an interactive graphical user interface platform of the back-end application computer server 150 (and, in some cases, third-party data) may facilitate forecasts, decisions, predictions, and/or the display of results via one or more remote administrator computers (e.g., to gather additional information about planned or actual allocations) and/or the remote user device 160. For example, the first remote user device 160 may transmit annotated and/or tagged information to the back-end application computer server 150. Based on the updated information, the back-end application computer server 150 may adjust data in the planned and/or actual resource allocation data stores 110, 120 and the changes may be viewable via one or more physical reports 162 (e.g., created using templates). Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the entry, access, and/or update of electronic records in the planned and actual resource allocation data stores 110, 120. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the planned resource allocation data store 110 and/or actual resource allocation data store 120. The data stores 110, 120 may be locally stored or reside remote from the back-end application computer server 150. As will be described further below, the planned resource allocation data store 110 may be used by the back-end application computer server 150 in connection with an interactive user interface to enter and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and an enterprise resource management server might be co-located and/or may comprise a single apparatus and/or a cloud-based architecture.

Figure 2:
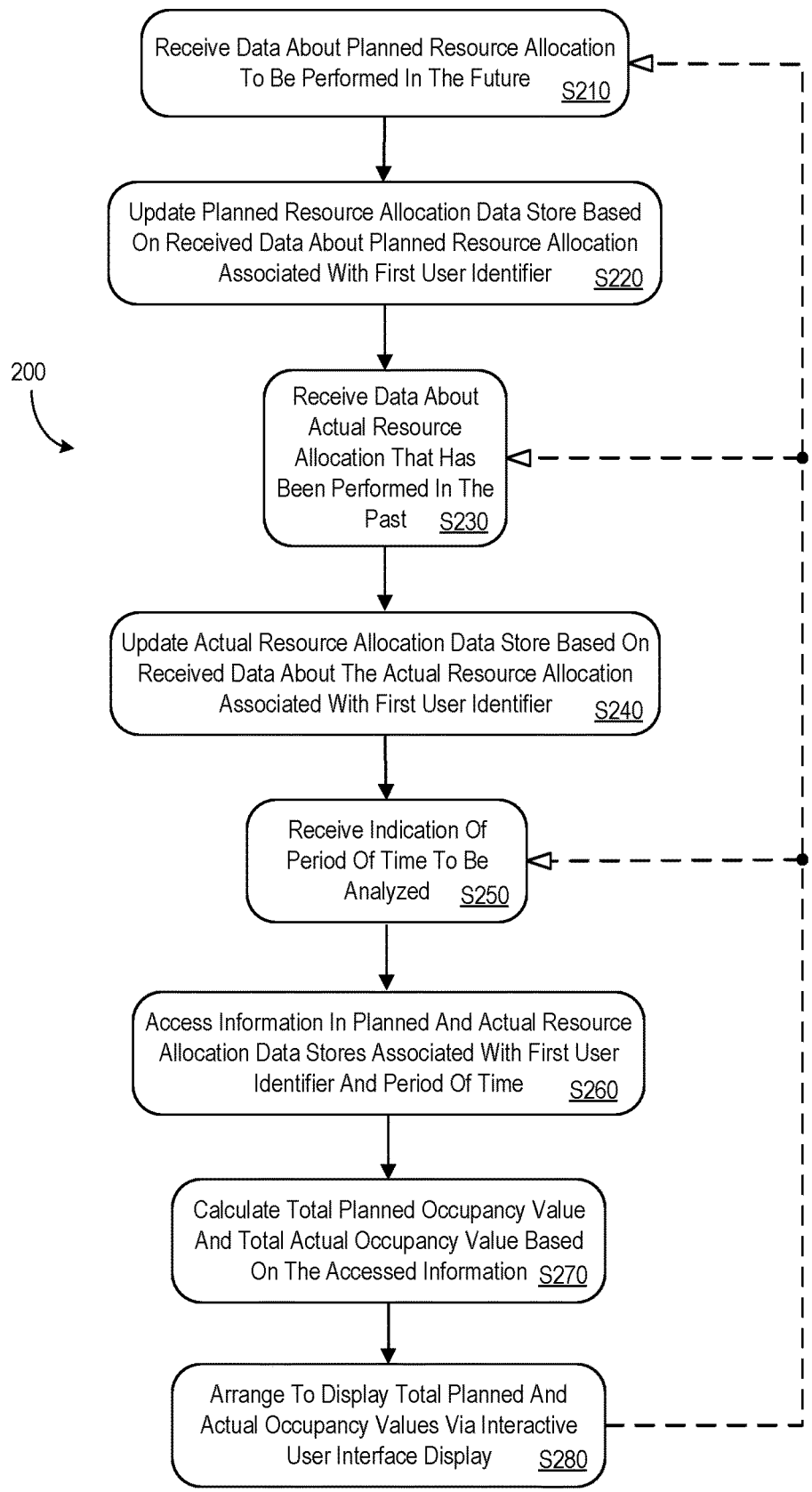
FIG. 2 illustrates a method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may receive, from a remote user device associated with a first user identifier, data about a planned resource allocation to be performed in the future. At S220, the system may update a planned resource allocation data store based on the received data about the planned resource allocation associated with the first user identifier. The planned resource allocation data store may, for example, contain electronic records that represent a plurality of planned resource allocations for the enterprise. According to some embodiments, each planned resource allocation includes an electronic record identifier and a set of planned resource allocation attribute values that include a resource allocation category and a user identifier. Other examples of planned resource allocation attribute values might include: a flag indicator, a target date, a text description, a work type, a date added, a start date, an end date, a completion date, a text comment, a status, a remaining amount of resource allocation, a geographic region (e.g., a particular state or office), etc.

At S230, the back-end application computer server may receive, from the remote user device associated with the first user identifier, data about an actual resource allocation that has been performed in the past. At S240, the system may update an actual resource allocation data store based on the received data about the actual resource allocation associated with the first user identifier.

At S250, the system may receive an indication of a period of time to be analyzed (e.g., an indication of a particular calendar week or month might be received from an employee or manager). At S260, the system may access information in the planned and actual resource allocation data stores associated with the first user identifier and the period of time. A total planned occupancy value and a total actual occupancy value may then be calculated at S270 based on the accessed information (e.g., reflecting how much of available resources are occupied with a resource allocation). At S280, the system may arrange to display the total planned and actual occupancy values via an interactive user interface display. In this way, an employee or manager may improve his or her understating of resource allocation predictions, decisions, patterns, etc. Moreover, the user interface display may be updated (as indicated by the dashed arrows of FIG. 2) when new planned data is received (e.g. S210), new actual data is received (e.g., S230), a different period of time is selected for analysis (e.g., S250), etc.

According to some embodiments, resource allocation information may be associated with allocations for a plurality of user identifiers. In this case, the back-end application computer server may be further programmed to automatically distribute the planned resource allocations among the plurality of user identifiers. For example, the planned resource allocations might be associated with planned hours of work for the enterprise, the actual resource allocations might be associated with actual hours worked for the enterprise, and various user identifiers may represent employee identifiers (e.g., employee numbers, names, user identifiers, etc.). In such cases, the back-end application computer server may be further programmed to calculate a total planned demand value, a total actual demand value, a total planned capacity value, an actual planned capacity value, etc. Moreover, in some embodiments, the back-end application computer server may also automatically generate and transmit an electronic alert flag, signal, or message when a variance value, calculated based on planned and actual resource allocations, crosses a pre-determined threshold level.

Figure 3:
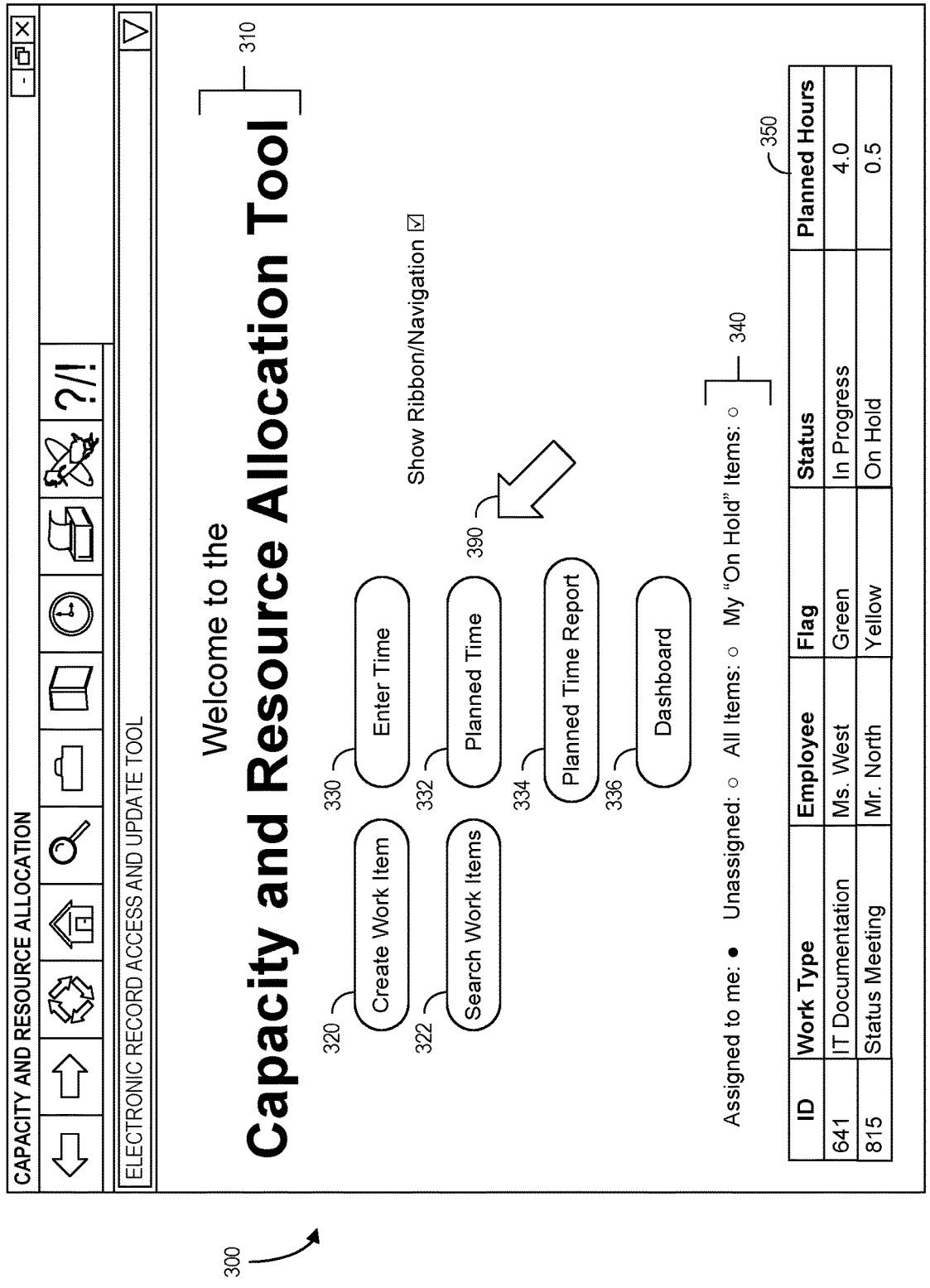
FIG. 3 is an example of a welcome display for a capacity and resource allocation information access and update tool in accordance with some embodiments.

FIG. 3 is an example of a welcome display 300 for a capacity and resource allocation information access and update tool in accordance with some embodiments. In addition to a welcome message 310, the display 300 includes navigation icons to create a work item 320 and 322. Further, the display 300 may include navigation icons to enter time 330 (e.g., actual time worked), enter planned time 332, generate a planned time report 334, and view one or more dashboard displays 336. Selection of various icons (e.g., via a touchscreen or computer mouse pointer 390) will result in the display of an appropriate user interface as described in connection with FIGS. 4 through 17). The welcome display 300 also includes user-selectable filters 340 (e.g., to select work items assigned to that particular employee, unassigned work items, all work items, "on hold" work items, etc.) and work item details 350 (e.g., including a work item identifier, work type, employee identifier, flags and/or statuses, planned hours, actual hours, etc.).

Figure 4:
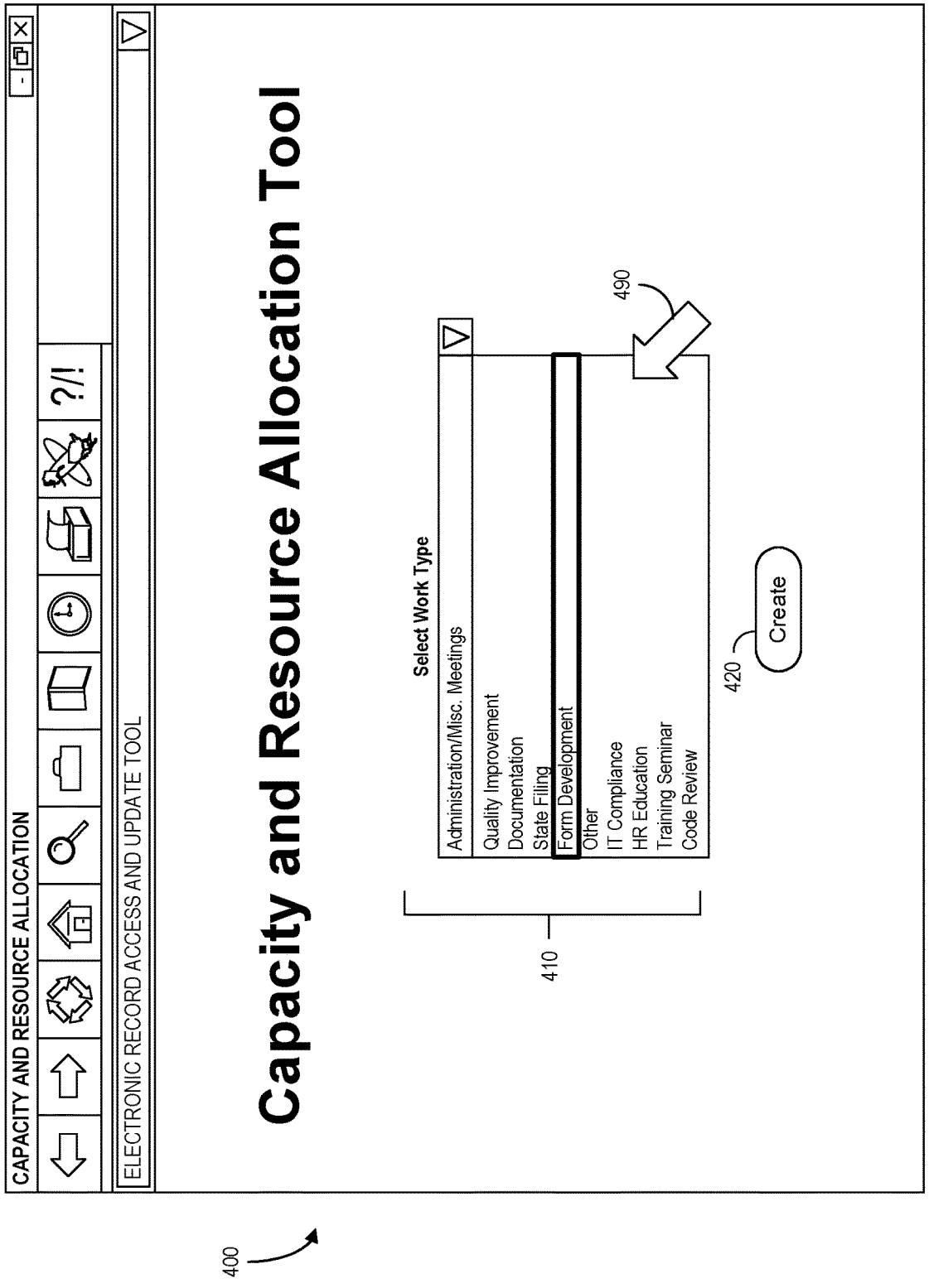
FIG. 4 is an example of a work type selection display according to some embodiments.

Selection of the "create work item" icon 320 may result in presentation of a work type selection display 400 such as the one illustrated in FIG. 4 according to some embodiments. This display 400 may include a drop-down menu 410 of potential work types that might be selected by a user (e.g., via a touchscreen or computer mouse pointer 490). When the appropriate work type is highlighted, the user may select a "Create" work item icon 420. Examples of work types might include various work categories such as those to "Run a Business" (e.g., associated with tasks that are completed as part of day-to-day "keep the lights on" functionality), "Portfolio" tasks, (e.g., larger projects or initiatives that are being executed), "Development" (e.g., for tasks such as coaching, one-on-one training, team meetings, town halls, professional development, annual reviews), etc. According to some embodiments, each category may also be broken down into "buckets." For example, the system may include overarching buckets and/or customized buckets created by users.

FIG. 5 is an example of an add work display 500 in accordance with some embodiments. The add work display 500 includes data entry fields 510 to provide a date added, a target start date, a target end date, a revised end date, a sub work type, an employee (e.g., an analyst name), a help desk ticket identifier, etc. According to some embodiments, the display 500 further includes a description text entry box 520, a comments text entry box 522, flag and status fields 530 (e.g., red, yellow, or green status flags), a category/bucket selection 540, planned hours, actual hours, and original planned hours entries 550. The display 500 may further include a state selection 560 (e.g., when an employee of an insurance enterprise works on policies associated with various US states), a "Submit" icon 570, and a "Cancel" icon 580. According to some embodiments, the display 500 further includes an "Attach File" icon 575 that may be used to associate an attachment file to a planned or actual resource allocation. The attachment file may, for example, be stored at a back-end application computer server (and, as a result, may be available to other users who might not otherwise have a way to access the file). The attachment file might, for example, be associated with a text document, a word processing document, an image file, an audio file, a spreadsheet application file (e.g., an EXCEL® worksheet, a link to a file (e.g., a URL), an executable file, etc.

Selection of the category/bucket 540 (e.g., via a touchscreen or computer mouse pointer 590) may result in display of a drop-down menu of appropriate work types. For example, FIG. 6 is an example of a display 600 where such a category/bucket list 640 is being selected via a pointer 690 according to some embodiments. Note that the category/bucket list might be populated based at least in part on information entered via the display 400 of FIG. 4. The display 600 also includes some user-entered data such as description text 620 (describing the work item) and comment text 622 (who edited the work item along with when it was edited). Selection of the "Submit" icon 670 by the user will result in the work item being created by the system.

Figure 7:
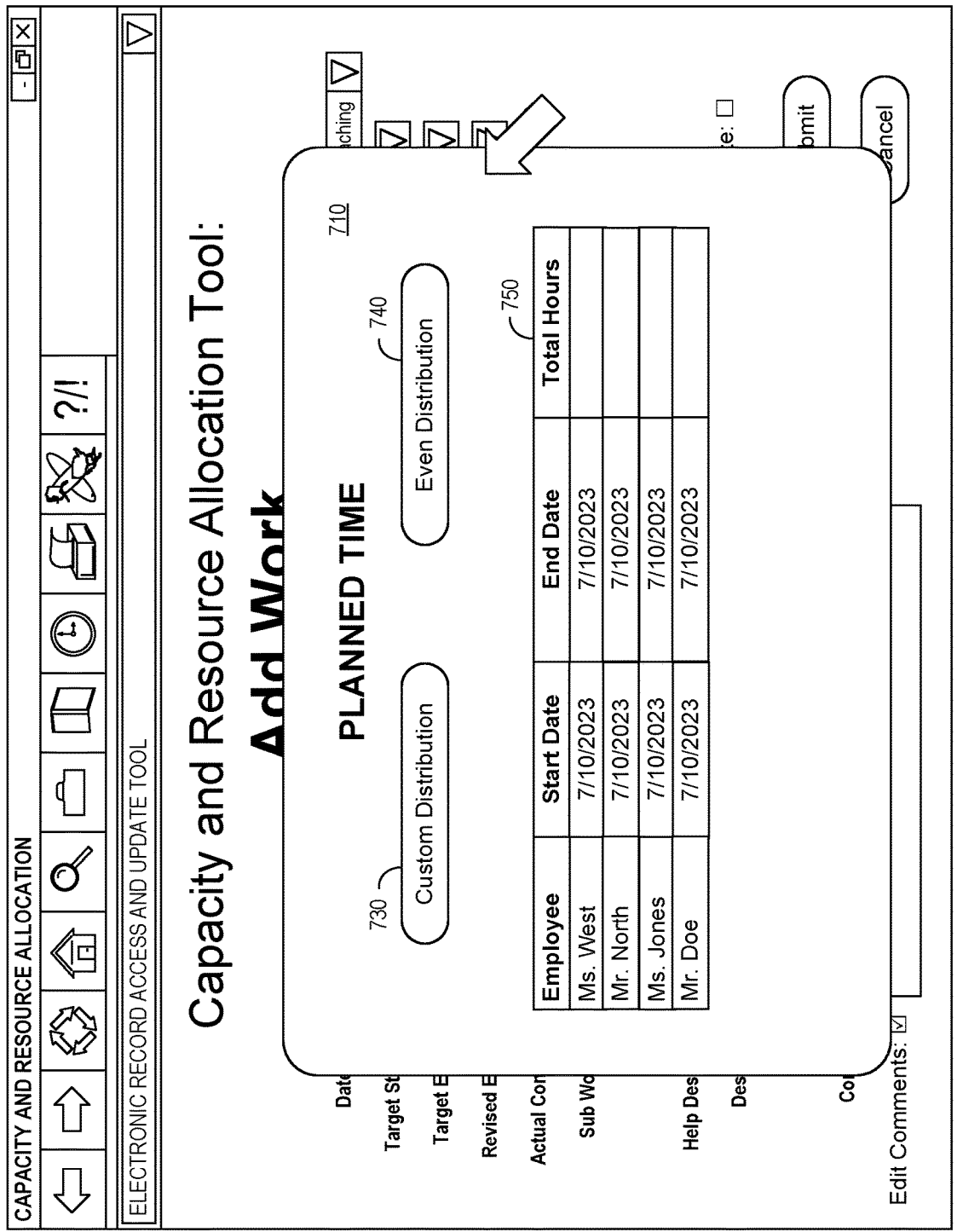
FIG. 7 is an example of a planned time display in accordance with some embodiments.
Figure 8:
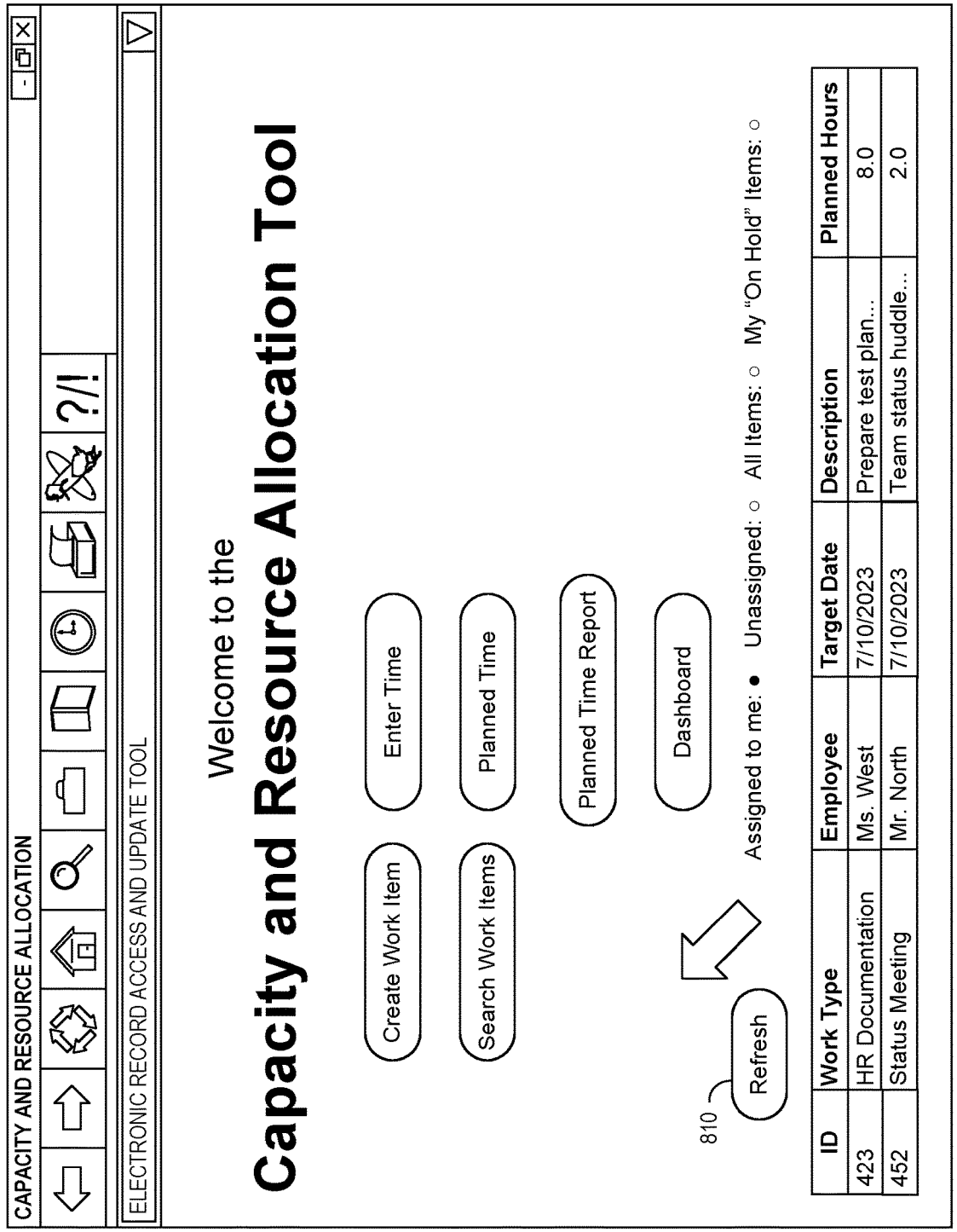
FIG. 8 is an example of a welcome navigation display according to some embodiments.

FIG. 7 is an example of a planned time display 700 in accordance with some embodiments. The display 700 includes a popup window 710 that can be utilized by an employee or manager to enter a total number of planned hours (e.g., per day or week) for a group of employees. The distribution of the time among those employees might be customized 730 or be automatically evenly distributed 740 (e.g., a back-end application computer server might divide the time equally among each of the four employees illustrated in the window 710 of FIG. 7). FIG. 8 is an example of a welcome navigation display 800 according to some embodiments. According to some embodiments, selection of "Refresh" icon 810 will result in the system updating the information that is presented on the display (e.g., to reflect new planned or actual hours).

FIG. 9 is an example of a work search display 900 in accordance with some embodiments. The display 900 might be used by an employee or manager to select various filters to help locate a work item or time entry. For example, the work type 910, employee name 920, flag 930, and status 940 filters might be defined by a user. Note that leaving a filter blank (e.g., via a "Clear All" icon) will result in everything from that category potentially being included in a search result. The display 900 also lets a user enter dates 950 (e.g., a date added range, a target date range, and/or a completion date range) to help locate a work item. Selection of a "Search" icon 960 (e.g., via a touchscreen or computer mouse pointer 990) will cause the system to execute the defined search and display the appropriate results. According to some embodiments, even deleted work items may be included in the search results.

Figure 10:
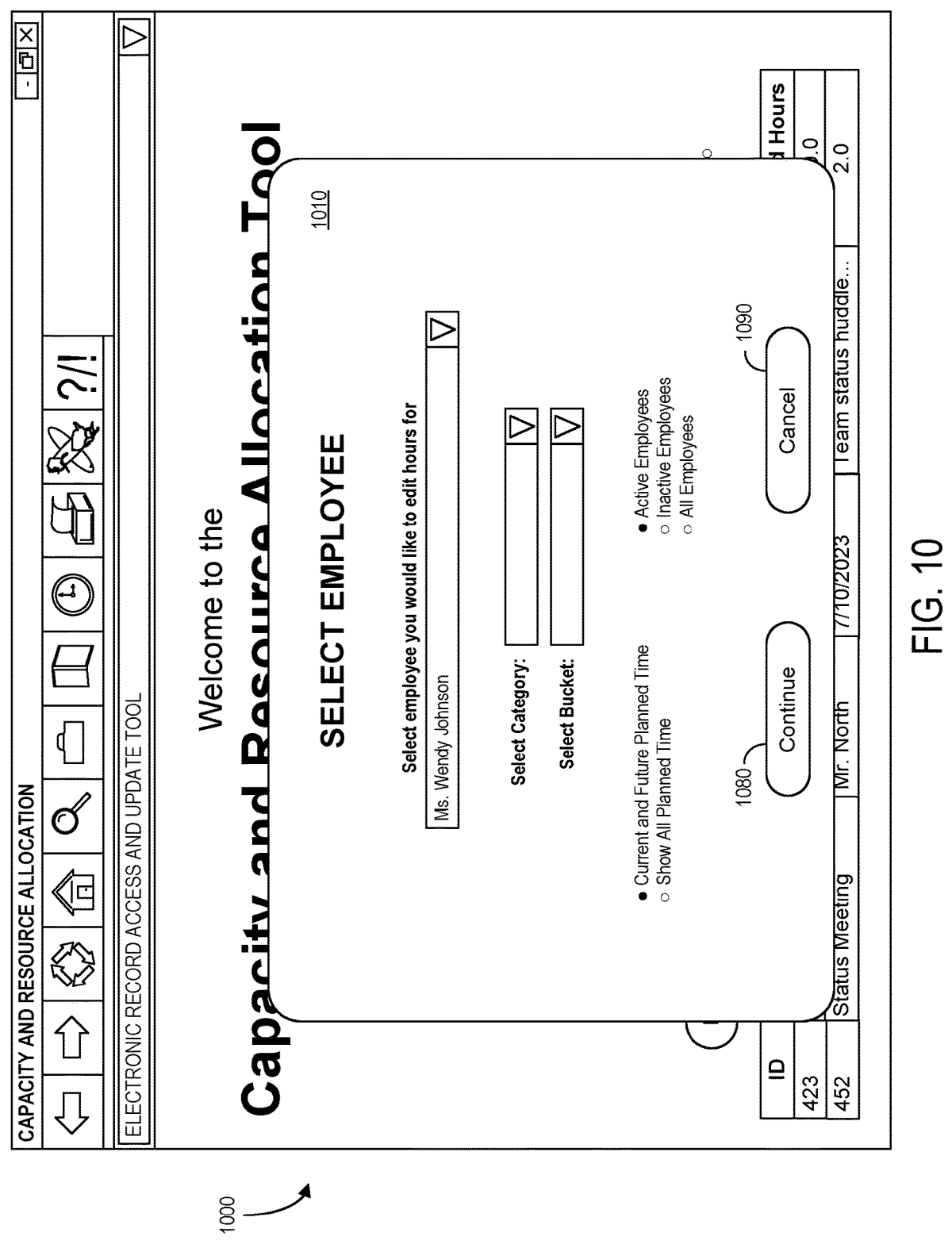

Thus, some displays may be used to create and/or search for specific work items (e.g., associated with a particular project, task, type of activity, etc.). In some cases, however, an employee may spend time on tasks that are not necessarily associated with a pre-defined work item (and it might not be work creating a work item for that type of resource allocation). In this case, the system may provide for a generic bucket/category to be used to track such resource allocations (planned or actual). For example, FIG. 10 is an example of an employee selection display 1000 according to some embodiments. The display 1000 includes a popup window 1010 that can be utilized to enter resource allocations for an employee (e.g., assigning the employee's resource allocations to a generic category/bucket as opposed to a specifically created work item). The window 1010 includes employee name, work category, and work bucket selections. The window 1010 may also include an ability to select current and future planned time (or all planned time) and active, inactive, or all employees. Selection of a "Continue" icon 1080 will cause the system to execute the search and display the results. Selection of a "Cancel" icon 1090 will stop the search process (e.g., and return to the welcome screens 300, 800 of FIG. 3 or 8, respectively). According to some embodiments, data for a particular employee may be automatically displayed (but that employee may choose another teammate when assisting them or if responsible for entering time for a project team). The user may then select a category from a dropdown for the category he or she wants to enter time for (the system may automatically return all categories he or she has previously planned for if one is not selected). Similarly, the user may select a bucket from a dropdown for the bucket he or she want to enter time for (the system will automatically return all buckets he or she has previously planned for if one is not selected).

Figure 11:
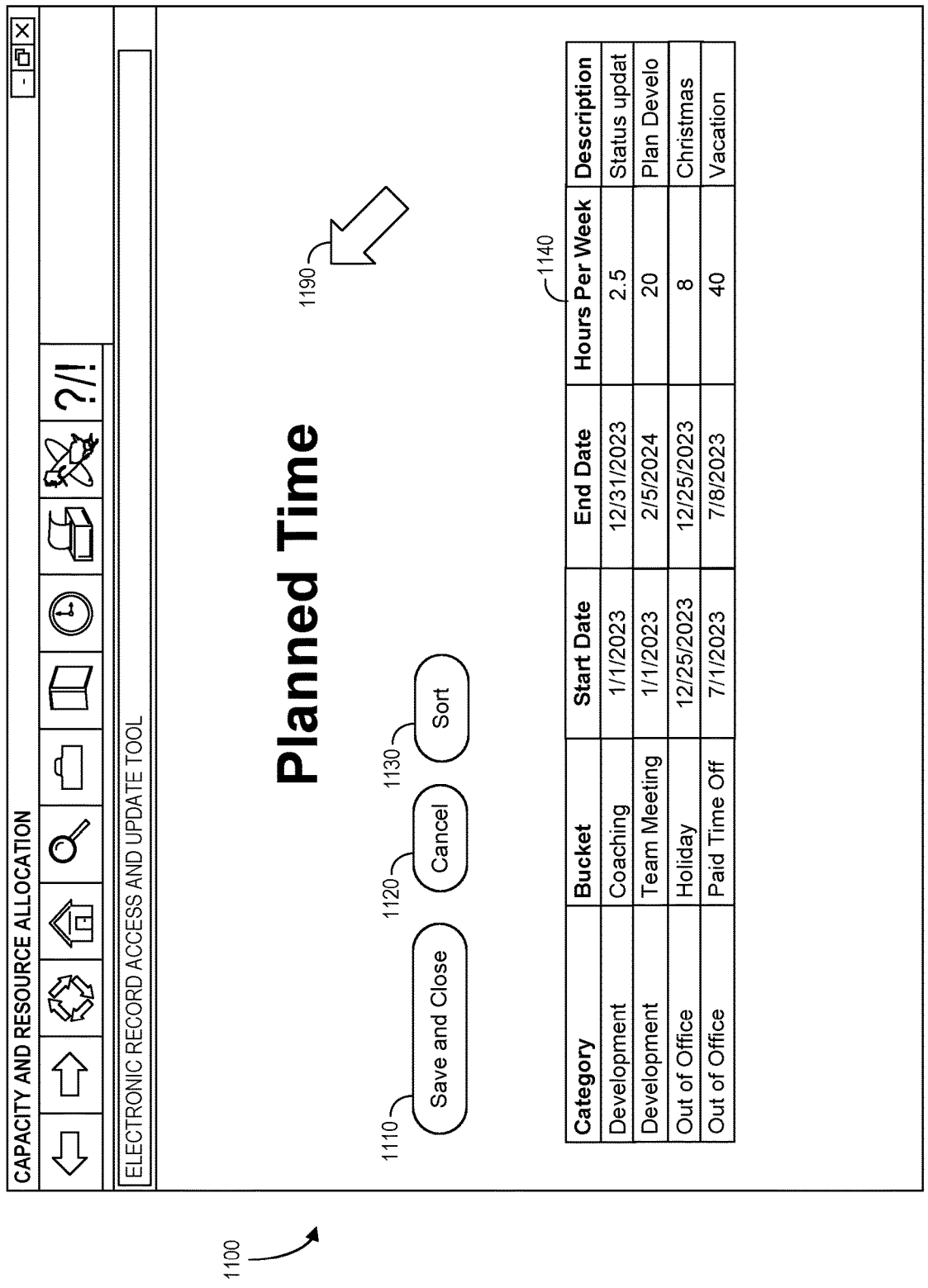
FIG. 11 is an example of a planned time display in accordance with some embodiments.

FIG. 11 is an example of a planned time display 1100 in accordance with some embodiments. A user may select "Save and Close" 1110, "Cancel" 1120, and/or "Sort" 1130 icons (e.g., via a touchscreen or computer mouse pointer 1190). In addition, the display 1100 includes planned time data 1140 (e.g., a work category, bucket, start date, end date, planned hours per week, and a work item description). An employee may use the planned time display to edit existing planned time (including adjusting dates, adjusting a number of hours per week, adding information into the description field, etc.). Selecting the "Save and Close" 1110 icon will commit the changes and close the form. Selecting the "Sort" icon 1130 may automatically sort all entries first by category, then by bucket, and then by start date.

Consider, for example, a project that is ahead of schedule or an employee's involvement in that project is ending earlier than originally planned. The employee may initially access the planned time display 1100 when assigned to a portfolio project from February 1 to March 31 at 8 hours per week as illustrated in Table 1.

TABLE 1

| Planned Time | | | | | |
|---|---|---|---|---|---|
| Category | Bucket | Start Date | End Date | Hours/Week | Description |
| Portfolio | Meetings | Feb. 1, 2023 | Mar. 31, 2023 | 8 | |

Then employee then finds out that the project is ahead of schedule and will now end on March 15. The employee can use the planned time display to adjust the end date of the project to March 15 as illustrated in Table 2.

TABLE 2

| Planned Time | | | | | |
|---|---|---|---|---|---|
| Category | Bucket | Start Date | End Date | Hours/Week | Description |
| Portfolio | Meetings | Feb. 1, 2023 | Mar. 15, 2023 | 8 | |

It may be important than an employee update project date ranges as it may have a direct impact on project and work planning for a department. Note that the same procedure can be done for any change in the timeframe for a work item. Consider now when an employee has been involved in a project and the amount of allocated time changes in the middle of the project. Consider, for example, an employee who is assigned to a project from January 1 until May 31 for 10% of his or her time as illustrated in Table 3.

TABLE 3

Planned Time

| Category | Bucket | Start Date | End Date | Hours/ Week | Description |
|---|---|---|---|---|---|
| Portfolio | Meetings | Jan. 1, 2023 | May 31, 2023 | 4 | |

In February, the employee is told that 20% of his or her time will now be allocated to that project effective March 15. The employee may use the planned time display 1100 to create a second line item for that project to plan for that change in allocation. In this example, the employee may end the first line item on March 14 (the day before the new line item begins) as illustrated in Table 4.

TABLE 4

Planned Time

| Category | Bucket | Start Date | End Date | Hours/ Week | Description |
|---|---|---|---|---|---|
| Portfolio | Meetings | Jan. 1, 2023 | Mar. 14, 2023 | 4 | |
| Portfolio | Meetings | Mar. 15, 2023 | May 31, 2023 | 8 | allocated 20% |

During a project planning session, an employee may be selected as a resource for a project and have entered that project into the planned time display 1100 as illustrated in Table 5.

TABLE 5

Planned Time

| Category | Bucket | Start Date | End Date | Hours/ Week | Description |
|---|---|---|---|---|---|
| Portfolio | Meetings | Feb. 1, 2023 | Mar. 31, 2023 | 8 | |

The next week, before the project starts, he or she is told that need are needed on a different project and will no longer be supporting the original project. The employee may remove the old project via the planned timed time display 1100. In order to do this, the employee may simply delete the hours per week value (or enter "0" hours) as illustrated in Table 6, and the system will no longer reflect this project in his or her planned time.

TABLE 6

Planned Time

| Category | Bucket | Start Date | End Date | Hours/ Week | Description |
|---|---|---|---|---|---|
| Portfolio | Meetings | Feb. 1, 2023 | Mar. 31, 2023 | 0 | |

FIG. 12 is an example of an actual time entry display 1200 according to some embodiments. The display 1200 includes actual time worked data 1210, including a work category and bucket and a number of hours worked for each day of the week. The time worked data 1210 is used to calculate total weekly hours 1220 (e.g., 38 hours as illustrated in FIG. 12). The display 1200 may be accessed via the "Enter Time" icon 330 on the welcome display 300 and may be used by an employee to enter his or her time for a particular work week. Initially, the system may automatically populate the data 1210 with: the current week visible in a week selection portion 1250 and all Category and bucket combinations available to the employee (e.g., as designated by each department of an enterprise). The system may also bring to the top of the list and highlight any buckets that the employee has planned time for during the week along with any previously tracked time for that week. The display 1200 may be used, for example, to enter time on a daily basis by inputting the number of hours spent working in a particular category and bucket on the corresponding day. As another approach, the employee may enter all of his or her time for an entire week under any day for the appropriate category and bucket in which the employee has worked. The view of the total weekly hours 1220 may be automatically updated or a "Refresh" icon (not illustrated in FIG. 12) may be selected to update the data. When the employee has completed inputting work hours, he or she can select a "Save and Close" icon 1230 or "Save" icon 1240 (e.g., via computer mouse pointer 1230) to commit the updates or, in some embodiments, select a "Cancel" icon to discard any changes and return to the welcome screen 300.

According to some embodiments, clicking on a "Select Week" field in the week selection portion 1250 will result in the appearance of a popup calendar. The employee may then choose any day that any date for time entry and click "OK." The system may indicate that any changes he or she has made to the current week will be saved before continuing. The display 1200 will then open up the time entry form for the week (Sunday through Saturday) that contains the chosen by the employee. According to some embodiments, the values in the Bucket field may appear as links. If an employee clicks on one of the links, the system it will take you to a planned time form to allow the employee to edit or add planned time.

Figure 13:
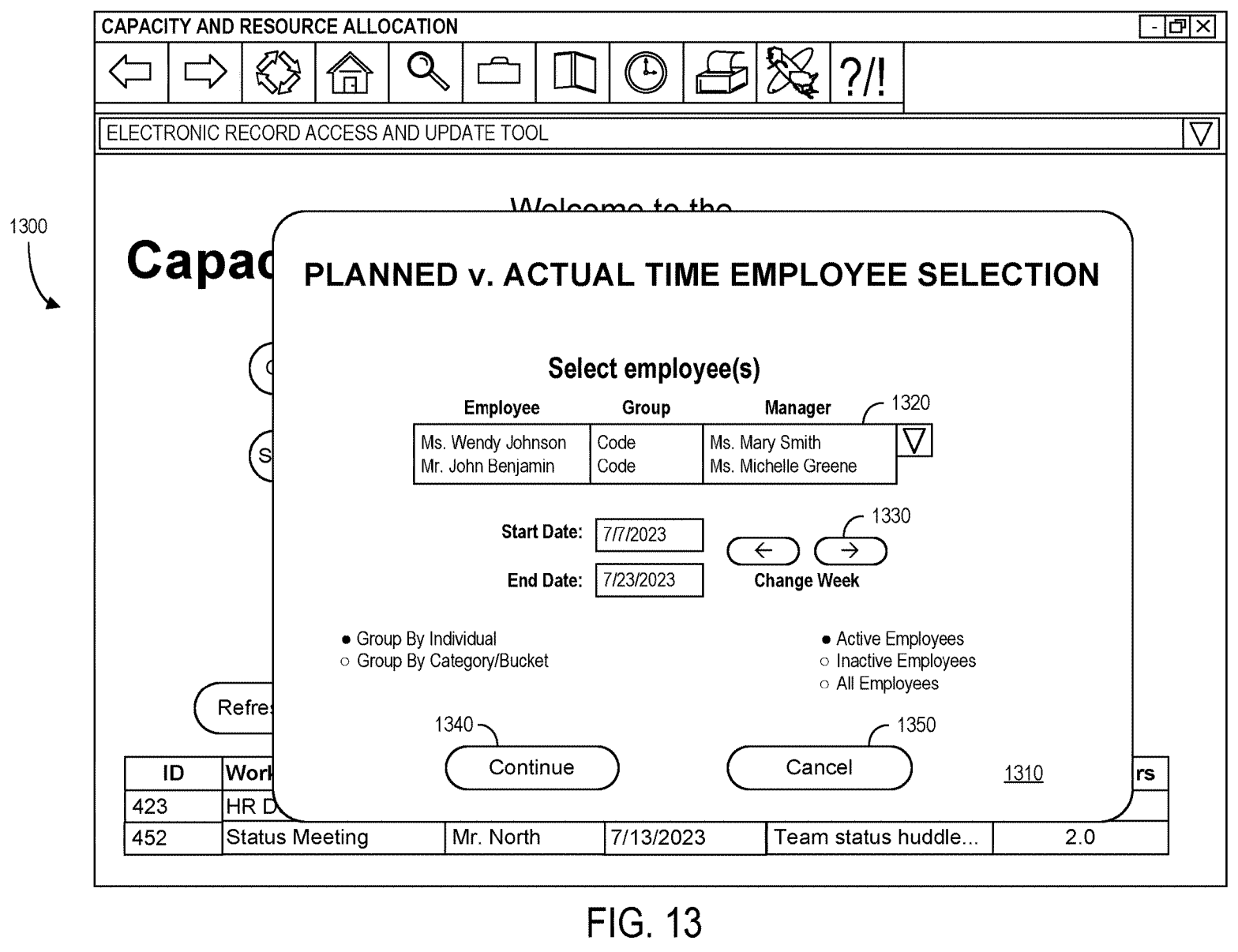

FIG. 13 is an example of a planned v. actual time employee selection display 1300 in accordance with some embodiments. The planned time report may provide an employee or manager with a view of planned hours and actual hours for a chosen timeframe (along with total occupancy information). From the welcome display 300, selection of the "Planned Time Report" icon 334 results in the display of the popup window 1310. One or more employees to be analyzed may be selected 1320 along with a particular work week 1330. According to some embodiments, the report may be grouped by individuals or category and/or bucket. Moreover, the report may include active employees, inactive employees, or all employees. Selection of a "Cancel' icon 1350 returns to the welcome screen 300.

Selection of a "Continue" icon 1340 provides a planned v. actual time display 1400 such as the one illustrated in FIG. 14 according to some embodiments. The display 1400 includes a popup window 1410 showing a planned v. actual time analysis. In particular, the popup window 1410 includes a "Show Detail" icon 1420 and a "PDF Export" icon 1430 (e.g., to create a physical report of the analysis). Time details 1440 may include categories/buckets, planned and actual hours worked, and total values for the selected work week 1450. The popup window 1410 also includes automatically calculated values 1460 such as a planned total demand, a planned total capacity, a planned total occupancy, an actual total demand, an actual total capacity, and/or an actual total occupancy. According to some embodiments, at least one of the planned resource allocations and actual resource allocations includes Paid Time Off ("PTO") hours and/or holiday hours (and the total demand and capacity values may be calculated excluding those resource allocations). According to some embodiments, the planned demand (based on planned time) v. total capacity (based on a 40-hour work week) provides the planned occupancy of an individual, or a team when multiple employees are selected. The actual demand (actual hours recorded) v. total capacity (based on a 40-hour work week) provides the actual occupancy of an individual, or a team when multiple employees are selected for analysis. Note that the values 1460 might automatically remove "out-of-office" time (e.g., holidays and PTO) before being automatically calculated.

Figure 15:
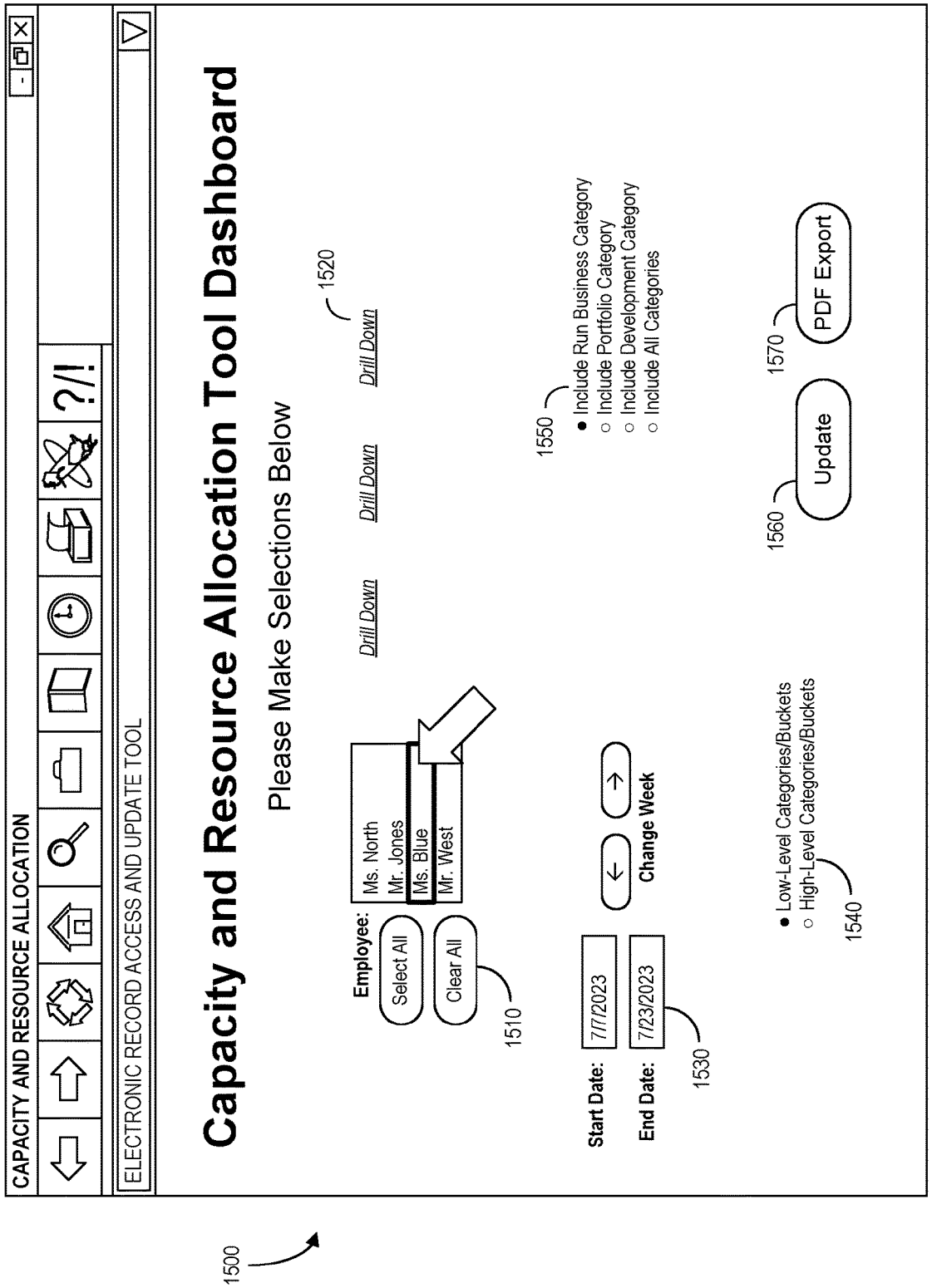

According to some embodiments, a back-end application computer server is further programmed to support a dashboard display in accordance with at least one a dashboard selection. For example, FIGS. 15 and 16 are examples of dashboard selection displays 1500, 1600 in accordance with some embodiments. In particular, FIG. 15 is a dashboard selection display 1500 that can be used to select one or more employee identifiers 1510, provide additional filters 1520, define an analysis date range 1530, indicate if low-level or high-level categories and/or buckets should be grouped, and select which work categories should be included on the dashboards 1550. Selection of an "Update" icon 1560 will result in the display of the dashboards as described with respect to FIG. 17, and selection of a "PDF Export" icon 1570 may result in the generation of a physical report containing the dashboard information. FIG. 16 illustrates a dashboard selection display 1600 after additional filters have been defined. In particular, the user has indicated that the dashboard should be associated with a particular department 1610 ("Analytics") and a particular team of employees 1620 ("Product Quality).

Figure 17:
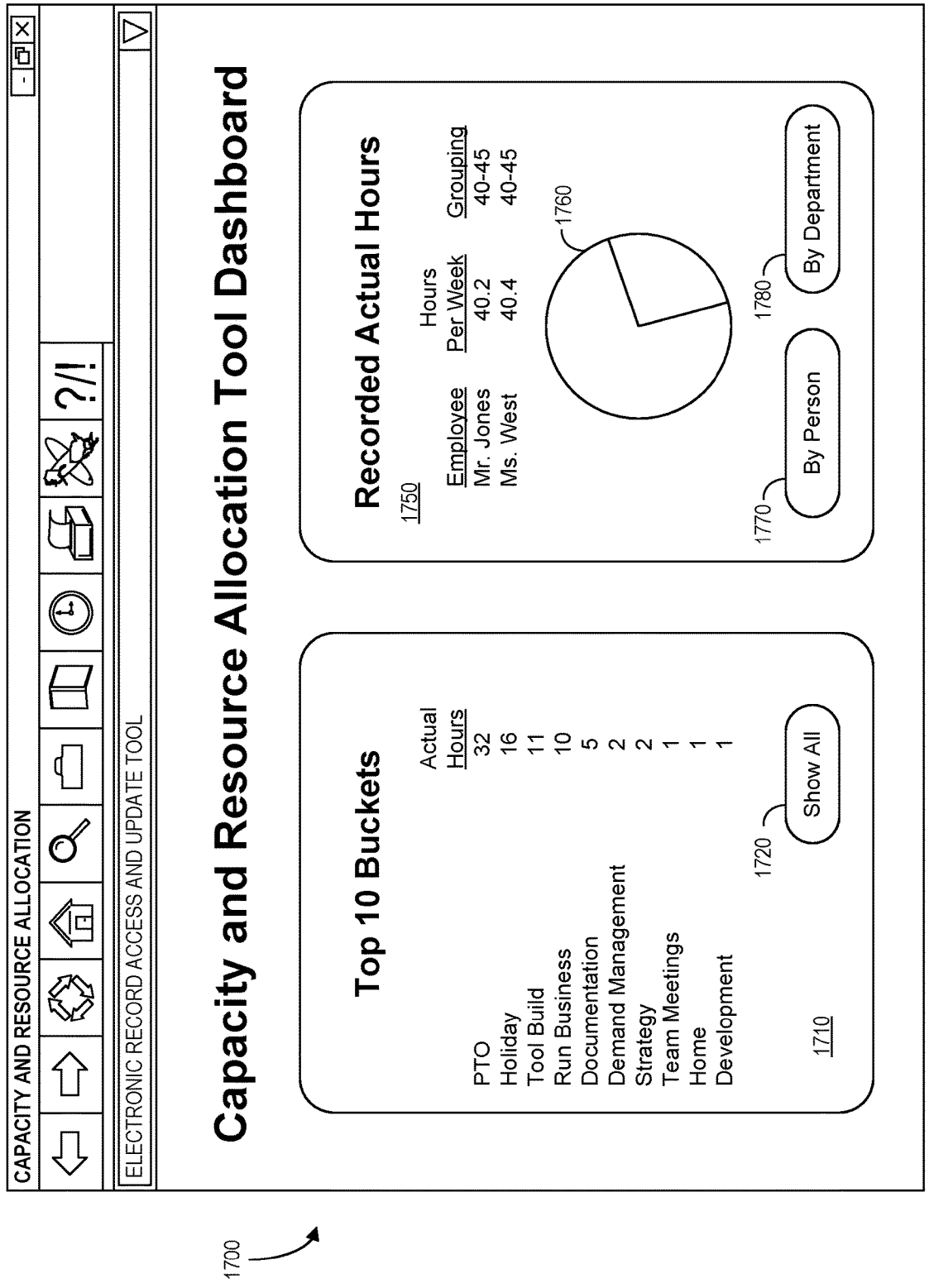
FIG. 17 is an example of a dashboard display in accordance with some embodiments.

The automatically created dashboard displays might include, for example, a top project list, a graphical actual resource allocation chart, a graphical planned resource allocation chart, etc. For example, FIG. 17 is an example of a dashboard display 1700 in accordance with some embodiments. The display 1700 includes a top ten bucket portion 1710 (with an option to "Show All" 1720 buckets) and a recorded actual hours portion 1750 with a graphical pie chart display 1760 illustrating various types of actual hours worked. The recorded actual hours portion 1750 also includes a "By Person" selection 1770 and a "By Department" selection 1780 that will result in the pie chart display 1760 being updated as appropriate. Other examples of dashboard displays might include a planned hours portion, a historical v. future planned hours analysis, etc.

Figure 18:
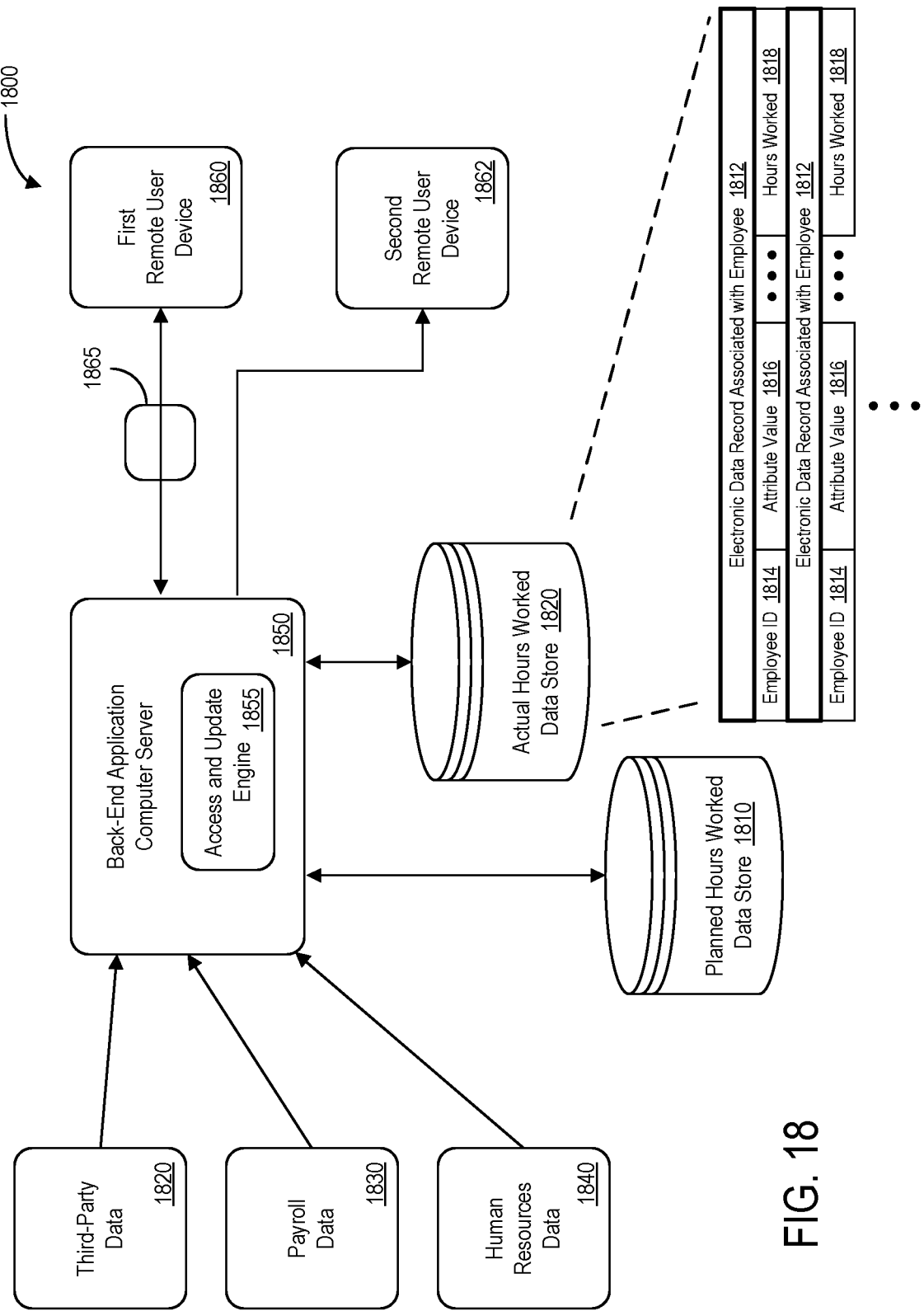
FIG. 18 is a more detailed block diagram of a system according to some embodiments.

FIG. 18 is a more detailed block diagram of a system 1800 according to some embodiments. As before, the system 1800 includes a back-end application computer server 1850 that may access information in a planned hours worked data store 1810 and an actual hours worked data store 1820 (e.g., storing a set of electronic records 1812 representing employees, each record including, for example, employee identifiers 1814, attribute variables 1816, hours worked 1818, etc.). The back-end application computer server 1850 may also retrieve information from other data stores or sources in connection with an access and update engine 1855 to populate, access, verify, analyze, and/or update the electronic records. The back-end application computer server 1850 may also exchange information with remote user devices 1860, 1862 (e.g., via a firewall 1865). According to some embodiments, an interactive graphical user interface platform of the back-end application computer server may facilitate forecasts, decisions, predictions, and/or the display of results via one or more remote administrator computers (e.g., to gather additional information about workloads) and/or the remote user devices 1860, 1862.

According to some embodiments, the back-end application computer server 1850 may also receive external information, such as third-party data 1820, payroll data 1830, and human resources data 1840 (e.g., legacy time sheet records). This data might be used, for example, to pre-populate fields in the planned and/or actual resource allocation data stores 1810, 1820. A user may then review the information via remote user devices 1860, 1862 and transmit updated information to the back-end application computer server 1850. Based on the updated information, the back-end application computer server 1850 may adjust data in the actual and/or planned hours worked data stores 1810, 1820 and make that information available to other employees of an enterprise as appropriate. According to some embodiments, the back-end application computer server 1850 may transmit information to an email server, workflow application, a chatbot text interface, a streaming video interface, a voice recognition application, or a calendar function (e.g., to generate reminders that an employee has not entered hours or entered unusual information). This information might be used by the system 1800, for example, to automatically establish a channel of communication with an employee, automatically transmit a message to a manager, etc. Similarly, the back-end application computer server 1850 might transmit updated electronic records 1812 to a manager for manual review and a determination of a proposed or approximate resource allocations for a project.

Figure 19:
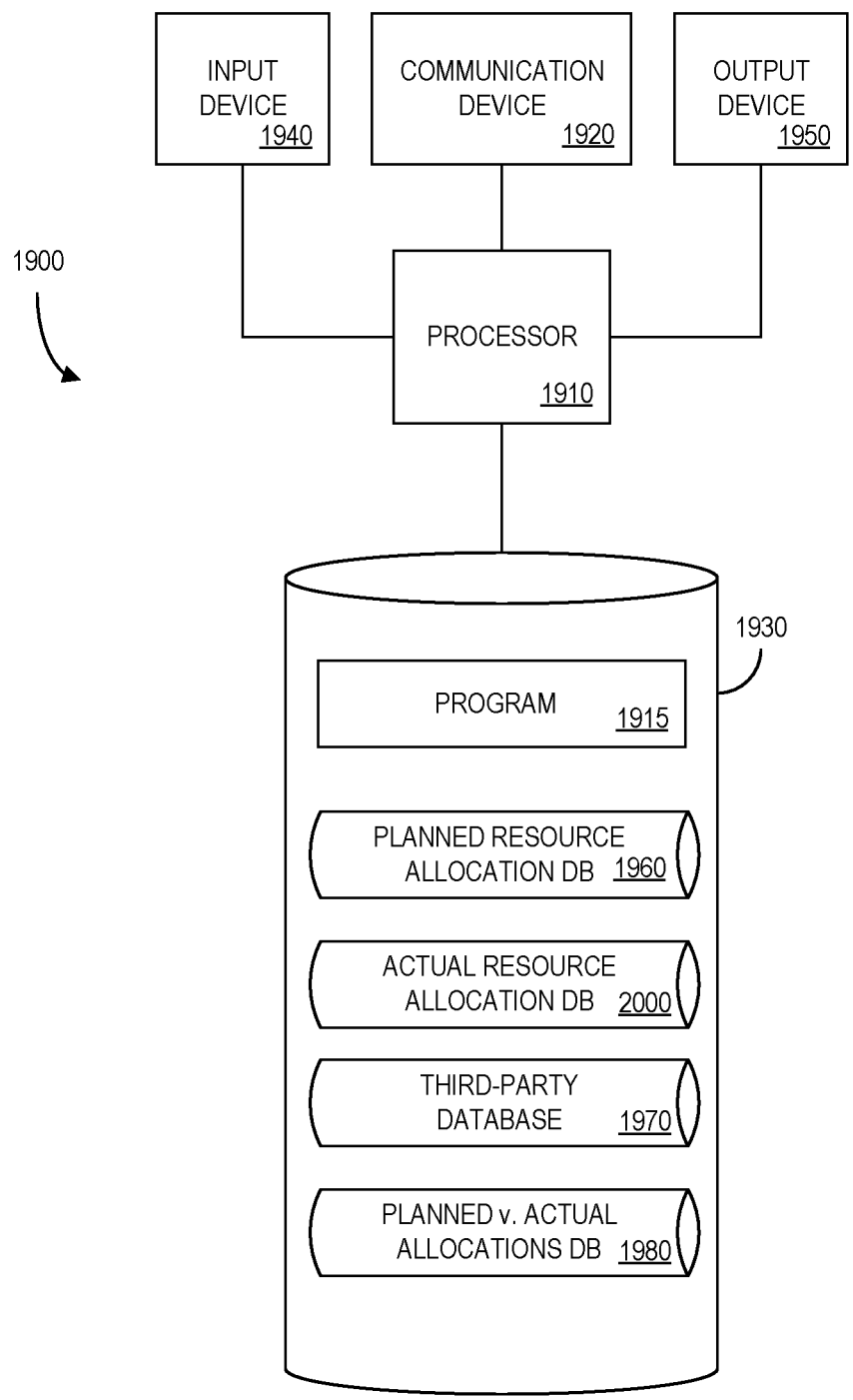
FIG. 19 is a block diagram of an apparatus in accordance with some embodiments of the present invention.

The embodiments described herein may be implemented using any number of different hardware configurations. For example, FIG. 19 illustrates an apparatus 1900 that may be, for example, associated with the systems 100, 1800 described with respect to FIGS. 1 and 18, respectively. The apparatus 1900 comprises a processor 1910, such as one or more commercially available Central Processing Units ("CPUs") in the form of one-chip microprocessors, coupled to a communication device 1920 configured to communicate via a communication network (not shown in FIG. 19). The communication device 1920 may be used to communicate, for example, with one or more remote administrator computers and or communication devices (e.g., PCs and smartphones). Note that communications exchanged via the communication device 1920 may utilize security features, such as those between a public internet user and an internal network of the insurance enterprise. The security features might be associated with, for example, web servers, firewalls, and/or PCI infrastructure. The apparatus 1900 further includes an input device 1940 (e.g., a mouse and/or keyboard to enter information about projects and work items, etc.) and an output device 1950 (e.g., to output reports regarding capacity, occupancy, demand, etc.).

The processor 1910 also communicates with a storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 stores a program 1915 and/or a risk evaluation tool or application for controlling the processor 1910. The processor 1910 performs instructions of the program 1915, and thereby operates in accordance with any of the embodiments described herein. For example, the processor 1910 may receive, from a remote user device associated with a first user identifier, data about planned and actual resource allocations and update appropriate data stores. The processor 1910 may also receive an indication of a period of time to be analyzed and access information in data stores associated with the first user identifier and the period of time. A total planned occupancy value and a total actual occupancy value may then be calculated by the processor 1910 and displayed via an interactive user interface based on the accessed information.

The program 1915 may be stored in a compressed, uncompiled and/or encrypted format. The program 1915 may furthermore include other program elements, such as an operating system, a database management system, and/or device drivers used by the processor 1910 to interface with peripheral devices.

As used herein, information may be "received" by or "transmitted" to, for example: (i) the back-end application computer server 1900 from another device; or (ii) a software application or module within the back-end application computer server 1900 from another software application, module, or any other source.

In some embodiments (such as shown in FIG. 19), the storage device 1930 further stores a planned resource allocation database 1960, an actual resource allocation database 2000, a third-party database 1970 (e.g., storing a list of employee and category identifiers), and planned v. actual database 1980 (e.g., storing automatically generated analysis information, predictions, recommendations, etc.). An example of a database that might be used in connection with the apparatus 1900 will now be described in detail with respect to FIG. 20. Note that the database described herein is only an example, and additional and/or different information may be stored therein. Moreover, various databases might be split or combined in accordance with any of the embodiments described herein. For example, the actual resource allocation database 2000 and planned v. actual database 1980 might be combined and/or linked to each other within the program 1915.

Referring to FIG. 20, a table is shown that represents the actual resource allocation database 2000 that may be stored at the apparatus 1900 according to some embodiments. The table may include, for example, entries associated with employees who do work for an enterprise. The table may also define fields 2002, 2004, 2006, 2008, 2010 for each of the entries. The fields 2002, 2004, 2006, 2008, 2010 may, according to some embodiments, specify: an employee identifier 2002, an employee name 2004, a category/bucket (and associated date) 2006, planned hours worked 2008, and actual hours worked 2010. The actual resource allocation database 2000 may be created and updated, for example, based on information electrically received from various computer systems, including those associated with remote employee terminals.

The employee identifier 2002 may be, for example, a unique alphanumeric code identifying an employee who performs work for an enterprise. The employee name 2004 may be associated with that employee and the category/bucket (and date) 2006 might indicate which projects he or she has worked on (or plans to work on). The planned hours worked 2008 might indicate how many hours per week that employee anticipates working on the project while the actual hours worked 2010 indicates how much time the employee actually spent working on the project. The information in the planned resource allocation database 2000 may also be used to generate an estimated workload values that can be used by a manager to plan future resource allocations.

Thus, embodiments may provide an automated and efficient way to enter, access, and update electronic records representing resource allocations for an enterprise in a way that provides faster, more accurate results. Embodiments may also provide an ability to help with work and resource planning, by letting a user, manager, senior leader, etc. view clear snap shots of a team or team member's planned and actual time. By accurately recording planned time and actual time spent on work items, the system may help employees not only to plan their own workload, but also let a leadership team better understand how they can prioritize projects, resource plan, and take on new initiatives to accomplish the goals of an organization.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 21:
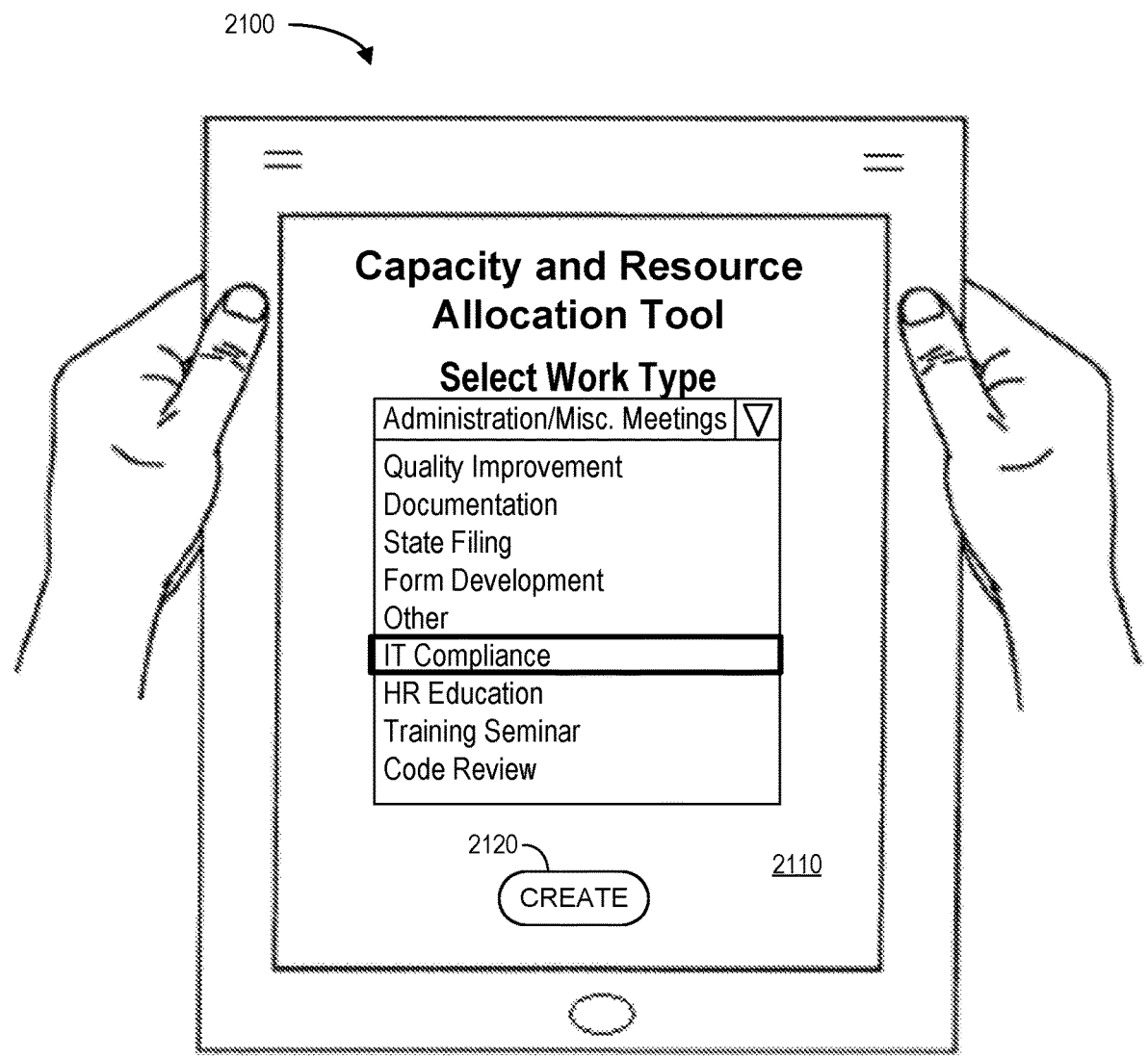
FIG. 21 illustrates a tablet computer displaying a capacity and resource allocation display user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of enterprises (e.g., an insurance company), embodiments may instead be associated with other types of businesses in additional to and/or instead of those described herein (e.g., financial institutions, universities, governmental departments, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 21 illustrates a handheld tablet computer 2100 showing a capacity and resource allocation display 2110 according to some embodiments. The capacity and resource allocation display 2110 might include work type data (e.g., categories, buckets, etc.) that can be selected and/or modified by a user of the handheld computer 2100 (e.g., via a "Create" icon 2120) to select a work type for a resource allocation.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to access and update electronic record information via a back-end application computer server of an enterprise, comprising:
   (a) a planned resource allocation data store associated with an encrypted database management system and containing electronic records that represent a plurality of planned resource allocations for the enterprise and, for each planned resource allocation, an electronic record identifier and a set of planned resource allocation attribute values including a resource allocation category and a user identifier;

(b) an actual resource allocation data store containing electronic records that represent a plurality of actual resource allocations;
(c) the back-end application computer server, coupled to the planned and actual resource allocation data stores, including:
a computer processor, and
a computer memory, coupled to the computer processor and storing instruction that, when executed by the computer processor, cause the back-end application computer server to:
(i) receive, from a remote user device, data about planned resource allocations to be performed in the future in connection with a plurality of user identifiers,
(ii) update the planned resource allocation data store based on the received data about the planned resource allocation associated with the plurality of user identifiers by automatically distributing the planned resource allocations among the plurality of user identifiers,
(iii) receive a period of time for receipt of data about an actual resource allocation for a first user identifier,
(iv) responsive to the received period of time, generate a first interactive user interface display including a list of one or more category and bucket combinations available for the first user identifier,
(v) move to a top of the displayed list and highlight in the displayed list at least one of: a first bucket with planned resource allocation for the period of time and at least one previously tracked actual resource allocation for the time period,
(vi) receive, from a remote user device associated with the first user identifier, data about an actual resource allocation that has been performed in the past,
(vii) update the actual resource allocation data store based on the received data about the actual resource allocation associated with the first user identifier,
(viii) receive an indication of a period of time to be analyzed,
(ix) access information in the planned and actual resource allocation data stores associated with the first user identifier and the period of time,
(x) automatically remove "out-of-office" time from the period of time to be analyzed,
(xi) automatically calculate a total planned occupancy value and a total actual occupancy value based on the accessed information and the removed "out-of-office" time,
(xii) arrange to display the total planned and actual occupancy values via a second interactive user interface display,
(xiii) automatically generate and transmit an electronic alert message when a variance value, calculated based on planned and actual resource allocations, crosses a pre-determined threshold level, and
(xiv) generate one or more physical reports created using templates;
(d) a communication port coupled to the back-end application computer server to facilitate a transmission of data with multiple remote user devices to support interactive user interface displays via at least one security feature and a distributed communication network; and
(e) an email server to receive information from the back-end application computer server that results in automatic establishment of a channel of communication with an employee in connection with a reminder that the employee has not entered actual resource allocation data.

2. The system of claim 1, wherein the planned resource allocation attribute values include all of: (i) a flag indicator, (ii) a target date, (iii) a text description, (iv) a work type, (v) a date added, (vi) a start date, (vii) an end date, (viii) a completion date, (ix) a text comment, (x) a status, (xi) a remaining amount of resource allocation, and (xii) a geographic region.

3. The system of claim 1, wherein at least one planned or actual resource allocation is associated with an attachment file, stored at the back-end application computer server and comprising at least one of: (i) a text document, (ii) a word processing document, (iii) an image file, (iv) an audio file, (v) a spreadsheet application file, (vi) a link to a file, and (vii) an executable file.

4. The system of claim 1, wherein the planned resource allocations are associated with planned hours of work for the enterprise, the actual resource allocations are associated with actual hours worked for the enterprise, and the first user identifier is an employee identifier.

5. The system of claim 4, wherein at least one of the planned resource allocations and the actual resource allocations include at least one of: (i) paid time off hours, and (ii) holiday hours.

6. The system of claim 5, wherein the back-end application computer server is further programmed to calculate at least one of: (i) a total planned demand value, (ii) a total actual demand value, (iii) a total planned capacity value, and (iv) a total actual capacity value.

7. The system of claim 1, wherein the back-end application computer server is further programmed to support a dashboard display in accordance with at least one dashboard selection.

8. The system of claim 7, wherein the dashboard display comprises at least one of: (i) a top project list, (ii) a graphical actual resource allocation chart, and (iii) a graphical planned resource allocation chart.

9. A computerized method to access and update electronic record information via a back-end application computer server of an enterprise, comprising:
receiving, at a computer processor of the back-end application computer server from a remote user device, data about planned resource allocations to be performed in the future in connection with a plurality of user identifiers;
updating a planned resource allocation data store associated with an encrypted database management system based on the received data about planned resource allocations associated with the user identifiers by automatically distributing the planned resource allocations among the plurality of user identifiers, wherein the planned resource allocation data store contains electronic records that represent a plurality of planned resource allocations for the enterprise and, for each planned resource allocation, an electronic record identifier and a set of planned resource allocation attribute values including a resource allocation category and a user identifier;

receiving a period of time for receipt of data about an actual resource allocation for a first user identifier;

responsive to the received period of time, generating a first interactive user interface display including a list of one or more category and bucket combinations available for the first user identifier;

moving, by the back-end application computer server, to a top of the displayed list and highlighting in the displayed list at least one of: a first bucket with planned resource allocation for the period of time and at least one previously tracked actual resource allocation for the time period;

receiving, at the back-end application computer server from the remote user device associated with the first user identifier, data about an actual resource allocation that has been performed in the past;

updating an actual resource allocation data store based on the received data about the actual resource allocation associated with the first user identifier;

receiving an indication of a period of time to be analyzed;

accessing information in the planned and actual resource allocation data stores associated with the first user identifier and the period of time;

automatically removing "out-of-office" time from the period of time to be analyzed;

automatically calculating a total planned occupancy value and a total actual occupancy value based on the accessed information and the removed "out-of-office" time;

arranging to display the total planned and actual occupancy values via a second interactive user interface display;

automatically generating and transmitting an electronic alert message when a variance value, calculated based on planned and actual resource allocations, crosses a pre-determined threshold level;

generating one or more physical reports created using templates;

transmitting, via a communication port coupled to the back-end application computer server, data with multiple remote user devices to support interactive user interface displays via at least one security feature and a distributed communication network; and receiving, at an email server, information from the back-end application computer server that results in automatic establishment of a channel of communication with an employee in connection with a reminder that the employee has not entered actual resource allocation data.

10. The method of claim 9, wherein the planned resource allocation attribute values include all of: (i) a flag indicator, (ii) a target date, (iii) a text description, (iv) a work type, (v) a date added, (vi) a start date, (vii) an end date, (viii) a completion date, (ix) a text comment, (x) a status, (xi) a remaining amount of resource allocation, and (xii) a geographic region.

11. A non-transitory, computer-readable medium storing instructions, that, when executed by a processor, cause the processor to perform a method to access and update electronic record information via a back-end application computer server of an enterprise, the method comprising:

receiving, at a computer processor of a back-end application computer server from a remote user device, data about planned resource allocations to be performed in the future in connection with a plurality of user identifiers;

updating a planned resource allocation data store associated with an encrypted database management system based on the received data about planned resource allocations associated with the user identifiers by automatically distributing the planned resource allocations among the plurality of user identifiers, wherein the planned resource allocation data store contains electronic records that represent a plurality of planned resource allocations for the enterprise and, for each planned resource allocation, an electronic record identifier and a set of planned resource allocation attribute values including a resource allocation category and a user identifier;

receiving a period of time for receipt of data about an actual resource allocation for a first user identifier;

responsive to the received period of time, generating by the back-end application computer server, a first interactive user interface display including a list of one or more category and bucket combinations available for the first user identifier;

moving, by the back-end application computer server, to a top of the displayed list and highlighting in the displayed list at least one of: a first bucket with planned resource allocation for the period of time and at least one previously tracked actual resource allocation for the time period, receiving, at the back-end application computer server from the remote user device associated with the first user identifier, data about an actual resource allocation that has been performed in the past;

updating an actual resource allocation data store based on the received data about the actual resource allocation associated with the first user identifier;

receiving an indication of a period of time to be analyzed;

accessing information in the planned and actual resource allocation data stores associated with the first user identifier and the period of time;

automatically remove "out-of-office" time from the period of time to be analyzed, automatically calculating a total planned occupancy value and a total actual occupancy value based on the accessed information and the removed "out-of-office" time;

arranging to display the total planned and actual occupancy values via a second interactive user interface display;

automatically generating and transmitting an electronic alert message when a variance value, calculated based on planned and actual resource allocations, crosses a pre-determined threshold level;

generating one or more physical reports created using templates;

transmitting, via a communication port coupled to the back-end application computer server, data with multiple remote user devices to support interactive user interface displays via at least one security feature and a distributed communication network; and receiving, at an email server, information from the back-end application computer server that results in automatic establishment of a channel of communication with an employee in connection with a reminder that the employee has not entered actual resource allocation data.

12. The medium of claim 11, wherein the planned resource allocations are associated with planned hours of work for the enterprise, the actual resource allocations are associated with actual hours worked for the enterprise, and the first user identifier is an employee identifier.

13. The medium of claim 12, wherein at least one of the planned resource allocations and the actual resource allocations include at least one of: (i) paid time off hours, and (ii) holiday hours.

14. The medium of claim 12, wherein the back-end application computer server is further programmed to calculate at least one of: (i) a total planned demand value, (ii) a total actual demand value, (iii) a total planned capacity value, and (iv) a total actual capacity value.

15. The medium of claim 11, wherein the back-end application computer server is further programmed to support a dashboard display in accordance with at least one dashboard selection and the dashboard display comprises at least one of: (i) a top project list, (ii) a graphical actual resource allocation chart, and (iii) a graphical planned resource allocation chart.

\* \* \* \* \*